Dec. 14, 1971
R. E. MANLEY  3,627,493
CONTROLLED TEMPERATURE CORROSION TESTING PROBE
Filed March 12, 1970
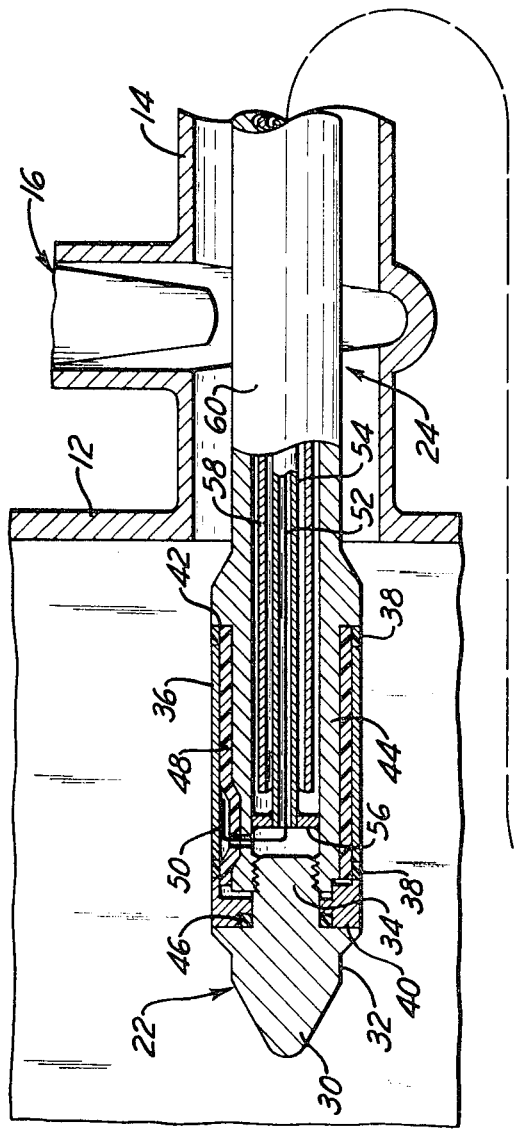
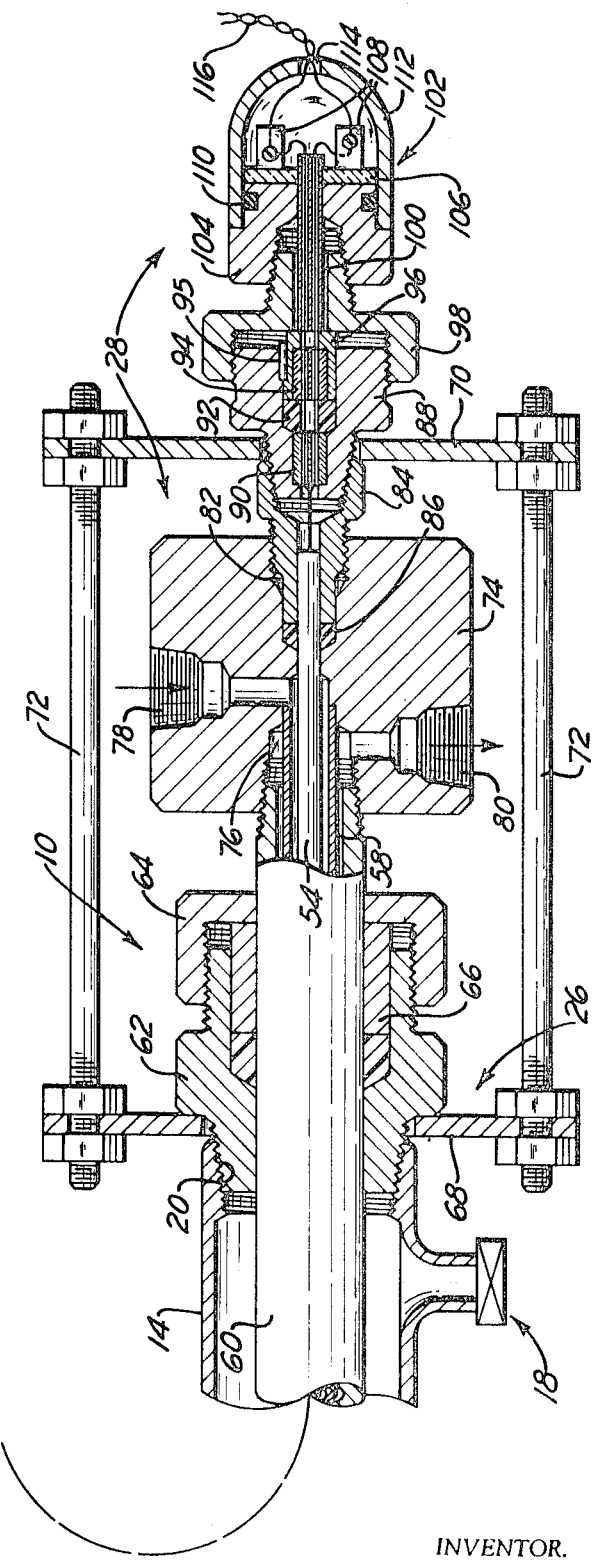
INVENTOR.
ROBERT E. MANLEY

United States Patent Office 3,627,493
Patented Dec. 14, 1971

3,627,493
CONTROLLED TEMPERATURE CORROSION
TESTING PROBE
Robert E. Manley, Lower Burrell, Pa., assignor to Gulf
Research & Development Company, Pittsburgh, Pa.
Filed Mar. 12, 1970, Ser. No. 18,964
Int. Cl. G01n 17/00
U.S. Cl. 23—253 C                                          11 Claims

ABSTRACT OF THE DISCLOSURE

A probe for testing the corrosion resistance of a specimen of a material to a stream of corrosive fluid comprising means to electrically isolate the specimen from the probe and means to control the temperature of the specimen. Temperature control is accomplished by flowing heat conditioning fluids, such as steam or cold water, through the probe, while isolating the specimen from the heat conditioning fluid.

---

This invention relates generally to the field of instruments for testing the properties of materials, and more particularly it pertains to a device for testing the corrosion resistance, under controlled temperature conditions, of various metals.

In petroleum refineries there are many situations in which metal elements such as tubes, pipes, vessel walls, tanks, and the like are subjected to highly corrosive, condensing and vaporizing, fluid streams. For example, the probe of the invention could be inserted in crude tower overhead lines, amine gas scrubber systems, debutanizer overhead lines, and many other units where a determination of corrosion rates is desired. It is desired to know the corrosion resistance of various metals in order to evaluate them for possible use as substitute or replacement materials of various components of various processing units in a refinery or other fluid processing facility. Another reason it is desirable to know the corrosion resistance of certain materials is for safety purposes. For example, when a particular processing unit is being designed, the corrosive fluid handling tubes or the like members will have had the types of and thicknesses of the materials of such members chosen on the basis of experience and engineering principles to have a certain useful life before failure. After the unit is on-stream and subject to actual operating conditions, it is important to measure the corrosion resistance or its reciprocal, the corrosion rate, in order to avoid an unexpected failure, which failure could result in a fire and/or explosion, or at least cause an expensive unscheduled work stoppage and some degree of product spoilage.

Under operating conditions, the corrosion rate of a corrosive fluid on a metal is often dependent upon the physical condition of the fluid, that is, whether the fluid is in a vapor or a liquid phase. The same corrosive fluid may have a different corrosion effect on any particular metal dependent upon whether the fluid is in a liquid phase, or in a vapor phase, or in a mixed part liquid and part vapor phase, and whether or not it is in the process of changing from one phase to another and which way it is going. Conventional corrosion testing means such as electrical resistance based devices, do not give accurate indications of corrosion in a system if located, for example, in the inlet to a heat exchanger prior to condensation or vaporization. The present invention does not suffer from this disadvantage because the specimen is actually subjected to the corrosive fluid.

However, these prior methods often did not have the capability to test the corrosion resistance of a specimen on-stream. That is, to actually insert the specimen in the stream of corrosive fluid. Even in these prior devices which do operate on-stream, a more difficult problem is to test the corrosion resistance of a specimen where the corrosive fluid is undergoing a phase change. That is, for example, where a vapor is condensing to a liquid, as in heat exchangers or condensers, or where a liquid is vaporizing into a gas, as in heaters, reboilers or distillation towers. Further, very severe corrosive conditions can be created by controlling the temperature of the probe. For example, many fluids are most corrosive while undergoing a phase change. By suitably heating or cooling the probe, that fluid can be forced to either condense or vaporize directly on the specimen.

The probe of the invention provides means to control and accurately measure the temperature of the specimen while it is being subjected to the corrosive fluid. Basically, the temperature controlling means comprises nested chambers or passageways within the probe body, and means to supply either a coolant, such as cold water, or heated fluid, such as steam, to the vicinity of the specimen. The ability to cool or heat the specimen with respect to the corrosive fluid permits simulation of multi-phase or phase changing conditions of the fluid on the specimen. For example, if the probe were cooled while in a gaseous stream, some gas can be made to liquefy on the specimen, thereby closely approximating the corrosive effect of a condensing vapor stream of that fluid on that material.

Additionally, the multiple phase or changing phase conditions existing at virtually inaccessible locations deep within a process unit may be simulated at any convenient location spaced from that particular unit. For example, assume a condensation from gas to liquid occurs within a unit at a location which is not accessible while the unit is on-stream, as in many heat exchangers. The temperature drop from inlet to outlet is of course known. The probe of the invention may be mounted in a supply conduit carrying only gaseous phase fluid, and the specimen on the probe cooled to a temperature below the inlet gas temperature or to any desired temperature in the inlet/outlet range, thereby simulating the multiple and changing phase conditions which exist within the unit.

In conjunction with the specimen temperature control feature of the probe of the invention, means are provided to hydraulically isolate the specimen from the temperature controlling fluid. Thus, utilizing the probe of the invention, it is possible to test the corrosion resistance of a metal specimen until perforation occurs, and it is possible to do so in an on-stream environment with temperature control of the specimen. Heretofore, it was virtually impossible to test a specimen to physical failure while controlling the temperature of the specimen and while performing an on-stream corrosion test of it, because the specimen was not isolated from the heat carrying fluid.

The hydraulic isolation feature yields an additional advantage for the probe of the invention in that a high degree of safety in use is provided. Heretofore, in devices of this general class, where a temperature controlling fluid was run directly through a tubular specimen which was subjected to a corrosive fluid, a danger existed of explosion or other severe loss or damage because of the possibility of co-mingling of the process fluid with the heat carrying fluid. In the event a hole appeared in the specimen, or a poor estimate of the specimen's corrosion resistance was made and the specimen was totally consumed the corrosive fluid would come into contact with the temperature controlling fluid in the probe. As is obvious to those skilled in the art, if the temperature controlling fluid was steam or water, and the corrosive fluid in the process unit was mostly hydrocarbons, contact between these two fluids would result in catalyst or product contamination, or excessive contamination of either the hydrocarbon stream or the temperature controlling fluid depending on the pressures involved. This could cause hazardous conditions and possibly an explosion, or at least cause an upset, and loss of operating time in the system.

Another advantage of the apparatus of the invention is that it provides means to electrically isolate the specimen from the remainder of the probe so as to preclude the possibility of galvanic attack on the specimen. If the specimen were not electrically isolated, the different metals of the specimen and of the probe, coupled with the corrosive fluid acting as an electrolyte, might result in a battery-like action which could consume the specimen to varying degrees, thereby destroying meaningful data as to the specimen's resistance to corrosion by the corrosive fluid in question. By electrically isolating the specimen, the operator knows with certainty that all corrosion and weight loss suffered by the specimen is due to the action of the corrosive fluid in question.

Prior devices measure an indication of corrosion, rather than actually measuring the results of the corrosion itself. However, since the specimen is electrically isolated from the remainder of the probe, it may be possible to adapt present technology so as to remotely measure the actual corrosion of the sample, by electrical resistance for example, rather than having to physically remove the probe and the specimen from the probe, and to then weigh the specimen.

Another advantage of the probe of the invention is that it may be used to measure the temperature of the environment. This can be accomplished by utilizing the heat transfer fluid in reverse, that is, to allow the environment to heat the fluid to the temperature of the environment rather than conrol the temperature of the probe.

The invention also has the ability, with suitable modifications, to simultaneously measure both the temperature of the specimen and of the environment, independently, by the addition of means such as a second thermocouple mounted elsewhere on the probe spaced from the specimen. With this modification, the one probe can be used to measure specimen and environment temperatures without interrupting the flow of the specimen heat conditioning fluid.

The present invention is the first successful device which will permit direct corrosion testing of a specimen with means to control the temperature of the specimen, and to do so without creating hazards.

The above and other advantages of the invention will be pointed out or will become evident in the following detailed description and claims, and in the accompanying drawing also forming a part of the disclosure, in which: the figure is a cross-sectional view of a probe embodying the invention shown in place in a process vessel, with some parts broken away and in cross-section, and some parts shown diagrammatically.

As used herein in the specification and claims, the term "process vessel" shall be understood to mean a conduit, a tube, a part of a processing unit, or generally any device which carries or through which flows a fluid whose corrosive characteristics with respect to a specimen it is desired to test.

Referring now in detail to the drawing, reference numeral 10 generally designates a probe assembly embodying the invention. Probe assembly 10 is shown mounted on a fluid handling portion of a commercial hydrocarbon processing unit, which portion comprises a main fluid carrying conduit 12 having an outwardly extending arm portion 14. Arm 14 is normally used to tap fluid into or out of the stream carried by main conduit portion 12, and is therefore provided with a shut-off valve 16, and a safety vent valve 18. The outer end of arm 14 is threaded as at 20, which threads are used to attach another conduit during normal operation.

As will be understood by those skilled in the art, the showing of the process equipment bearing reference numerals 12 through 20 inclusive is illustrative only, it being understood that probe 10 could be used with any process vessel, or in other locations on process equipment, such as special taps provided in many processes expressly for instrumentation. For this reason, the length of arm 14 is shown broken to indicate that it may be shorter or longer and that it could have other configurations. Where a valve like valve 16 is present, it is important that the valve be moved to the fully open position and not be closed while the probe is in place to avoid damaging the probe.

Probe assembly 10 comprises a specimen carrying probe head portion 22, a shank portion 24, a mounting portion 26, and an electrical and hydraulic utilities portion 28.

Probe head portion 22 comprises a nosepiece 30 formed with a plurality of wrench flats 32, and an inwardly extending threaded shank 34. Specimens are put on and taken off of the probe by removal of the nosepiece and the intervening parts described below. The specimen 36 is mounted between a pair of gaskets 38, the forward one of which bears against a sealing collar 40, and the rear one of which bears against a shoulder 42 formed on the probe head body 44. The gaskets 38 serve to both pressure seal and electrically isolate the specimen on the probe head. Shoulder 42 is the area of demarcation between head portion 22 and shank portion 24. Sealing means, such as an O ring 46, is provided between seal collar 40 and the nosepiece 30 at the juncture of the shank 34 with the remainder of the nosepiece. The gaskets 38 are formed of any suitable material, such as Teflon, (a registered trademark of E. I. du Pont de Nemours & Company for its tetrafluorethylene polymer plastic), nylon, or the like. Electrical insulation of the specimen 36 with respect to the probe is provided by gaskets 38 and by a sheath 48 formed of Teflon or other suitable electrical insulating material. The thickness of sheath 48 is shown somewhat exaggerated in the drawing for the sake of clarity, and is actually, in the successfully built and used embodiment of the invention, a shrink-fitted sheath of Teflon having a thickness in the range of about .015 to about .020 of an inch. The front end of probe head body 44 is provided with suitable threads to mate with and form a seal with the threads on nosepiece shank 34, to thereby hold the specimen 36 securely on the probe trapped between shoulder 42 and its gasket 38, and seal collar 40 and its gasket 38, while simultaneously forming a seal between the nosepiece and the seal collar by means of O ring 46.

Means are provided to sense the temperature of specimen 36 while it is in position in the process stream. To this end, a thermocouple 50 is joined to the inside surface of the specimen by any suitable means, such as a spring contact. The thermocouple leads 52 pass through suitably formed openings in the sheath 48 and the probe head body 44, and are conducted back to the electrical and hydraulic utilities portion 28 by means of a thermocouple conduit 54. In the successfully built and used embodiment of the invention, the thermocouple is Iron Constantan but any other suitable thermocouple could be used. Of course, the thermocouple contacts only the specimen.

Means are provided to control the temperature of the specimen 36, and to hydraulically insulate the specimen from the heat carrying or temperature conditioning fluid. To this end, a ring member 56 is provided between the end of conduit 54 and the adjacent portion of probe head body 44 rearward of the openings in the body 44 and sheath 48 that pass the thermocouple leads 52. Ring 56 is held in position by suitable means, such as silver soldering or welding, adapted to form a fluid tight seal. A heat carrying fluid inlet tube 58 is positioned concentrically to both and between thermocouple conduit 54 and the probe body 44, to thereby provide two nested passageways, i.e., one between tube 58 and conduit 54, and the other between tube 58 and body 44. Thus, supply and return passageways from the utilities portion 28, through shank portion 24, into head portion 22, and back to the utilities portion, are provided.

Since the probe of the invention may be exposed to very highly corrosive environments such as acidic gases, high temperatures, and the like, all parts of the probe which will come in contact with the environment are made of highly corrosive resistant metals and other materials, such as Monel, certain types of stainless steel such as Type 304, ceramics, Teflon, and the like.

Another advantage is that the invention may be used to simultaneously and independently test more than one material. This is simply accomplished by substituting a composite specimen, with the different materials isolated from each other by suitable gaskets or the like, for the single material specimen 36 shown in the drawing. Thus, the term "specimen" as used herein shall be understood to mean a test piece formed of one material, or a composite material testing arrangement.

Shank portion 24 comprises means to connect probe head portion 22 to mounting and utilities portions 26 and 28, and it therefore comprises a probe shank 60, which is a continuation of the probe head body 44, within which is nested, moving radially inwardly, the inlet tube 58, the conduit 54, and the thermocouple leads 52. The outside of probe shank 60 provides means against which mounting portion 26 cooperates to mount the assembly on a process vessel. To this end, mounting portion 26 comprises a packing gland 62 and a mating outer packing nut 64, between which is provided suitable sealing means 66 which may comprise a Teflon sealout and a stainless steel follower, in tandem, or the like. Sealing means 66 provides a fluid tight seal between the packing gland 62 and the probe shank 60. A fluid tight seal is provided at the outer end of arm 14 and the inner end of the packing gland 62 by cooperation between the threads 20 and suitable mating threads on the end of said packing gland, which threads are preferably pipe threads.

Means are provided to physically support the weight of the remaining portions of the apparatus with respect to the process vessel arm 14, and to hold the various parts together in the event excess pressure in the process vessel should tend to force them apart. To this end, an inner retainer member 68 is mounted between the end of arm 14 and packing gland 62, and an outer retainer member 70 is mounted between other portions of the apparatus described below. The two retainers 68 and 70 are interconnected by a plurality of tie bolts 72 which pass through suitably formed openings in the retainer members, and are held in place by nuts, washers, or other means on the threaded tie bolts 72. The retainers 68 and 70 may be donut-shaped, square plates, or of any other convenient configuration. In the embodiment of the invention which has been successfully built and used, the retainers are of rectangular shape, and two tie bolts 72 are provided.

Heat conditioning fluid is circulated through the probe of the invention by means of a utilities distribution block 74. Block 74 provides means to supply the temperature conditioning fluid, accommodates that fluid upon its return, and provides a passageway for the conduit 54 containing the thermocouple leads 52. To this end, block 74 is formed with a composite opening 76 which receives the end of probe shank 60 at its outermost portion by means of pipe threads, or other seal producing means, and which receives the end of inlet tube 58 at its innermost portions in sealing relationship, as by means of a silver soldered joint. Temperature conditioning fluid, such as cold water, steam, Freon, or the like, is supplied via a supply conduit (not shown) which communicates with a compound heat carrying fluid inlet port 78, which communicates with the inside of inlet tube 58. The annular fluid return passageway provided between the outside of tube 58 and probe shank 60 communicates with a heat conditioning fluid outlet port 80, to which a conduit (not shown) may be attached. The flow of steam or other fluid could be reversed through the probe if desired for any reason such as, for example, to flush the probe passageways. The normal flow direction described provides the greatest thermal isolation of the heat conditioning fluid before it contacts the specimen.

Means are provided to permit thermocouple conduit 54 to pass through block 74 and to the electrical utility portion 28. To this end, block 74 is formed with a fourth opening 82 in which is seated a thermocouple conduit packing gland 84 and a sealout member 86 formed of Teflon or other suitable material. Conduit 54 terminates within packing gland 82 outwardly of sealout 86. Since it is possible that the corrosive fluid in the process vessel could enter the inside of conduit 54 by way of an opening or other fault in the specimen and then passing through the thermocouple lead opening in the sheath 48 and probe head body 44, means are provided to produce a fluid tight seal around the thermocouple leads 52 themselves after they are separated and have exited from the conduit 54. To this end, a thermocouple lead packing gland 88 is provided, having its front end sealingly received within the rear end of the conduit packing gland 84. Gland 88 carries a two-hole ceramic sleeve 90, a two-hole sealout 92 formed of Teflon or other suitable material, and a second two-hole ceramic sleeve 94 housed within a follower member 96. A pin 95 holds follower 96 to packing gland 88 to thereby prevent twisting of the thermocouple leads.

The outer retainer 70, mentioned above, is mounted on the stud of gland 88, and is held thereon by interaction of said gland with conduit packing gland 84. Mounted on the rear end of gland 88 is a thermocouple lead packing nut 98 which contains a protective two-hole ceramic sheath 100. Mounted on the outer end of nut 98 is a thermocouple terminal head 102, which comprises a body 104, and an insulating ceramic layer 106 on which are mounted the two thermocouple terminals 108. Snugly mounted on body 104 by means of an O ring 110 is a protective cover 112 provided with an opening 114 through which electrical condutcors 116 pass for connection to the terminals 108.

As will be understood by those skilled in the art, the wires 116 lead to a suitable instrument which will register the temperature of the specimen, and this information is utilized by the operator in controlling the flow of heat carrying fluid through the probe to thereby control the temperature of the specimen.

While the invention has been described in detail above, it is to be understood that this detailed description is by way of example only, and the protection granted is to be limited only within the spirit of the invention and the scope of the following claims.

I claim:

1. Apparatus for testing the corrosion resistance of a specimen with respect to a fluid in a process vessel comprising a probe, means to mount the specimen on the probe with said specimen coextensive with a portion of said probe, means to electrically isolate the specimen with respect to the probe, said probe comprising means to control the temperature of the specimen and to isolate the specimen with respect to the temperature controlling means, means to directly sense the temperature of the specimen, and said temperature controlling means comprising means to flow a heat conditioning fluid through said probe to the portion of said probe which is coextensive with said specimen, whereby said heat conditioning fluid may control the temperature of said specimen.

2. The combination of claim 1, said temperature sensing means comprising an iron-constantan thermocouple.

3. The combination of claim 1, said electrical isolating means comprising a coextensive sheath of electrical insulating material on said probe between the coextensive portion said probe and said specimen and a pair of electrical insulating gasket members at the ends of said specimen between said specimen and said probe.

4. The combination of claim 3, said electrical insulating material comprising Teflon.

5. The combination of claim 1, said probe heat conditioning fluid flow means comprising a fluid passageway extending into said probe, through the vicinity of the specimen on the probe, and out the probe, and means to isolate and seal said passageway within said probe in the vicinity of the specimen from the specimen.

6. The comination of claim 5, said passageway being defined by an inner member extending through said probe in spaced relation to the wall thereof to the vicinity of the specimen thereon, a ring member sealingly mounted on the end of said inner member in the vicinity of said specimen between said inner member and the adjacent portion of the wall of said probe, and said passageway being further defined by a tubular member within said probe positioned in the space between the wall of said probe and said inner member and terminating in spaced relation to said ring member, whereby said passageway comprises communicating inner and outer concentric portions on opposite sides of said tubular member.

7. The combination of claim 6, and a heating conditioning fluid distribution block comprising an inlet opening and an outlet opening, means to mount said block on said probe on an end thereof spaced farthest from said specimen, means to communicate said inlet opening in said block with said passageway between said tubular member and said inner member, and means to communicate said outlet opening in said block with the portion of said passageway between said tubular member and the wall of said probe.

8. The combination of claim 6, a temperature sensing thermocouple in operative cooperation with said specimen, said inner member comprising a thermocouple lead conduit, and the electrical leads from said thermocouple passing through a suitably formed opening in the wall of said probe forwardly of said ring member defining said seal passageway and passing through the inside of said thermocouple lead conduit.

9. The combination of claim 1, said temperature sensing means comprising thermocouple means adapted to sense the temperature of the specimen, said electrical isolating means including a Teflon sheath positioned between the specimen and the outside wall of said probe, said temperature controlling means comprising a pair of nested conduits within said probe body with the thermocouple leads passing through suitably formed openings in the probe body wall and said Teflon sheath and passing through the inside of the inner of said nested conduits, means to seal said inner of said nested conduits at the outside thereof to said probe body, the outer of said pair of nested conduits terminating short of said sealing means, said probe comprising a shank portion with said specimen carrying apparatus at one end thereof and a utilities distribution assemblage at the opposite end thereof; means to flow temperature conditioning fluid from said utilities portion on one side of the outer of said nested conduits, around to the other side of said outer of said nested conduits and out said utilities portion; and means to conduct the thermocouple leads through the inside of the inner of said nested conduits, through said shank portion of said probe, and to electrical terminal means in said utilities portion.

10. The combination of claim 9, retainer means to support said utilities portion with respect to said shank portion comprising a pair of retainer plates and a plurality of tie bolts interconnecting said retainer plates, one of said retainer plates being mounted on said utilities portion, and the other of said retainer plates being mounted on support means.

11. The combination of claim 1, said means to mount the specimen on the probe coextensive with a portion of the probe comprising a specimen retaining shoulder formed on said probe, a removable nosepiece mounted on the front end of said probe, sealing means positioned between said nosepiece and the front end of said probe, and said specimen electrical isolating means comprising a Teflon sheath on said probe body positioned between the specimen and said probe body and a pair of electrical insulating gaskets one positioned between said shoulder and said specimen and the other positioned between said sealing ring and said specimen.

References Cited

UNITED STATES PATENTS

| | | | |
|---|---|---|---|
| 2,864,252 | 12/1958 | Schaschl | 23—253 C X |
| 3,418,848 | 12/1968 | Schaschl | 73—86 |
| 3,504,323 | 3/1970 | Meany, Jr. | 73—86 X |

OTHER REFERENCES

F. A. Champion: Corrosion Testing Procedures, 2nd edition, pp. 180–183 (1965). J. Wiley & Sons, Inc. (N.Y.). TA462C44.

JOSEPH SCOVRONEK, Primary Examiner

U.S. Cl. X.R.

73—86